(12) United States Patent
Jones et al.

(10) Patent No.: US 8,989,922 B2
(45) Date of Patent: Mar. 24, 2015

(54) MODULAR DRONE AND METHODS FOR USE

(71) Applicant: Azure Sky Group LLC, Alexandria, VA (US)

(72) Inventors: Adam Jones, Alexandria, VA (US);
Jason Van Valin, Occoquan, VA (US);
Paul K. Komla, Greenbelt, MD (US);
Andrew Luther, Alexandria, VA (US)

(73) Assignee: Azure Sky Group, LLC., Alexandria, VA (US)

( * ) Notice: Subject to any disclaimer, the term of this patent is extended or adjusted under 35 U.S.C. 154(b) by 0 days.

(21) Appl. No.: 13/838,325

(22) Filed: Mar. 15, 2013

(65) Prior Publication Data
US 2014/0277854 A1 Sep. 18, 2014

(51) Int. Cl.
*G05D 1/02* (2006.01)

(52) U.S. Cl.
CPC .................................. *G05D 1/0202* (2013.01)
USPC ................................................ 701/3; 701/22

(58) Field of Classification Search
CPC ..... G05D 1/0202; G05D 1/101; G05D 1/102; G05D 2201/126; G05D 2201/145; G05D 2201/146; G06K 9/00624; G06K 9/0063; G01S 13/825
USPC .......................... 701/3, 13, 15, 16, 408, 412; 340/539.19, 572.1, 572.2, 572.4, 10.1; 244/63
See application file for complete search history.

(56) References Cited

U.S. PATENT DOCUMENTS

| | | | |
|---|---|---|---|
| 2007/0061041 A1 | 3/2007 | Zweig | |
| 2007/0131754 A1 | 6/2007 | Brandon et al. | |
| 2008/0174478 A1* | 7/2008 | Whiteside et al. | 342/357.1 |
| 2009/0021351 A1 | 1/2009 | Beniyama et al. | |
| 2009/0243924 A1* | 10/2009 | Twitchell et al. | 342/357.07 |
| 2010/0100269 A1* | 4/2010 | Ekhaguere et al. | 701/26 |
| 2012/0197439 A1 | 8/2012 | Wang et al. | |
| 2012/0271461 A1* | 10/2012 | Spata | 700/276 |
| 2014/0061377 A1* | 3/2014 | Smith | 244/63 |
| 2014/0152507 A1* | 6/2014 | McAllister | 342/464 |

OTHER PUBLICATIONS

International Search Report for PCT/US2014/025911 dated Nov. 12, 2014.

* cited by examiner

*Primary Examiner* — Marthe Marc-Coleman
(74) *Attorney, Agent, or Firm* — Kramer Amado P.C.

(57) ABSTRACT

Various exemplary embodiments relate to a drone. The drone may include: a navigation unit configured to determine the location of the drone and navigate the drone to designated locations; a radio frequency identification (RFID) reader configured to read RFID tag information from RFID tags; and a wireless network transceiver configured to periodically transmit the location of the drone and RFID tag information to an inventory management system. Various exemplary embodiments relate to a method performed by a drone. The method may include: receiving navigation path information; navigating the drone along the navigation path based on satellite location signals; determining current position information based on the satellite location signals; reading RFID tag information from a first RFID tag; and transmitting the RFID tag information and the current position information via a wireless client to a central computing system.

20 Claims, 9 Drawing Sheets

MODULAR DRONE AND METHODS FOR USE

TECHNICAL FIELD

Various exemplary embodiments disclosed herein relate generally to a drone and methods for use.

BACKGROUND

Drones, such as unmanned aerial vehicles (UAVs) have been used by the military for various purposes. Recent legislation allows domestic use of drones in particular air space in accordance with pending FAA regulations. Proposed domestic uses for drones tend to focus on law enforcement and other government functions.

SUMMARY

In view of the foregoing, it would be desirable to provide drones for commercial use. Smaller drones may be battery powered and operate indoors or at low altitudes that do not require FAA authorization. In particular, it would be desirable to provide a modular drone that may be configured with electronics components for carrying out business tasks.

In light of the present need for a modular drone, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a drone. The drone may include: a navigation unit configured to determine the location of the drone and navigate the drone to designated locations; a radio frequency identification (RFID) reader configured to read RFID tag information from RFID tags; and a wireless network transceiver configured to periodically transmit the location of the drone and RFID tag information to an inventory management system.

In various embodiments, the wireless network transceiver is further configured to receive navigation path information including designated locations.

In various embodiments, the drone further includes: a memory configured to store pre-defined location information for a plurality of RFID tags, wherein the RFID reader is configured to read information from at least one of the RFID tags; and a processor configured to compare the location information from the navigation unit with the pre-defined location information of the read tag. The processor may be configured to determine an offset of the location information from the navigation unit with the pre-defined location information of the read tag and to correct a second navigation unit location information based on the offset. The wireless network transceiver may be further configured to determine a strength of a wireless network signal; and the processor is configured to triangulate location information based on the strength of the wireless network signal. The memory may further store a pre-defined navigation path including a plurality of designated locations corresponding to the plurality of RFID tags.

In various embodiments, the drone further includes a weatherized electronics casing surrounding the GPS navigation unit and the wireless network transceiver.

In various embodiments, the drone further includes a processor configured to correlate the RFID tag information with the location of the drone before transmitting the information to the inventory management system.

In various embodiments, the drone further includes a plurality of rotors.

In various embodiments, the drone further includes a message output device, wherein the wireless network transceiver is configured to receive location information of a customer and a message, the navigation unit is configured to pilot the UAV to a location near the customer, and the message output device is configured to deliver the message to the customer. The message output device may be one of an audio system, projector, and printer.

Various exemplary embodiments relate to a method performed by a drone. The method may include: receiving navigation path information; navigating the drone along the navigation path based on satellite location signals; determining current position information based on the satellite location signals; reading radio-frequency identification (RFID) tag information from a first RFID tag; and transmitting the RFID tag information and the current position information via a wireless client to a central computing system.

In various embodiments, the method further includes: associating the current position information with the RFID information based on a time when the RFID information is read; and transmitting the associated position information with the RFID information.

In various embodiments, the method further includes: reading a second RFID tag having a fixed location; determining the fixed location of the second RFID tag; determining position information for the time the second RFID tag is read based on the satellite location signals; and determining an offset of the fixed location from the position information, wherein the step of navigating the flight path based on satellite location signals includes determining adjusted position information based on the offset and the satellite location signals.

In various embodiments, the method further includes: determining a strength of a wireless network signal received via the wireless client; determining a distance from a wireless access point based on the strength of the wireless network signal; and adjusting the position information based on the distance from the wireless access point.

In various embodiments, the method further includes: determining that the drone has reached an end of the navigation path; and connecting the drone to a charger at the end of the navigation path.

Various exemplary embodiments relate to a network system. The network system may include: a plurality of RFID tags affixed to objects, the RFID tags storing tag information identifying the objects; a drone configured to: navigate the drone to designated locations, read the tag information from at least one of the RFID tags, determine a location of the drone, and wirelessly transmit the location of the drone and the read tag information; and an inventory management system configured to: receive the RFID tag information and drone location information from the drone, retrieve a record of the object identified by the tag information, and update the record with the location of the drone.

In various embodiments, the inventory management system is configured to correlate the drone location information and the RFID tag information based on a time that the information is received.

In various embodiments, the drone is configured to correlate the RFID tag information and the drone location information before transmitting the information.

In various embodiments, the inventory management system is further configured to: detect a change in the status of an object, determine an expected location of the object based on the record; and transmit the expected location to the drone as a designated location.

In various embodiments, the drone is further configured to: receive an identifier of an object and the expected location of the object, navigate to the expected location of the object, and determine whether an RFID tag including the identifier of the object is present at the expected location.

In various embodiments, the drone is an unmanned aerial vehicle including a plurality of rotors.

Various exemplary embodiments relate to a method of providing an offer to a target customer. The method may include: receiving customer preference data indicating interests of a plurality of potential customers; receiving provider offer data indicating a proposed offer; determining an offer area for the proposed offer; identifying a target customer by matching an interest of a potential customer with the proposed offer; receiving location data of the target customer; determining that the target customer is within the offer area; transmitting flight information including the location data to a drone; and delivering offer information, by the drone, to the target customer at a location within the offer area.

In various embodiments, the method further includes: sending a notification of a pending offer to the target customer; sending a request to a mobile device of the target customer for location data of the target customer; and receiving the location data from the mobile device of the target customer.

Various exemplary embodiments relate to a method of providing wireless connectivity. The method may include: providing an unmanned aerial vehicle (UAV) drone having a wireless repeater, the wireless repeater configured to connect to a wireless network; determining a location of a service disruption in the wireless network; programming the UAV to fly to a pre-determined elevation level; and forwarding wireless communications from the UAV to a wireless receiver in the wireless network using the wireless repeater. The wireless repeater may be a microwave transmitter and the wireless receiver is a microwave receiver located on a tower of the wireless network.

It should be apparent that, in this manner, various exemplary embodiments enable modular drones. In particular, by equipping a drone with communications electronics, the mobility and versatility of drones may be used for business purposes.

BRIEF DESCRIPTION OF THE DRAWINGS

In order to better understand various exemplary embodiments, reference is made to the accompanying drawings, wherein.

DETAILED DESCRIPTION

Figure 1:
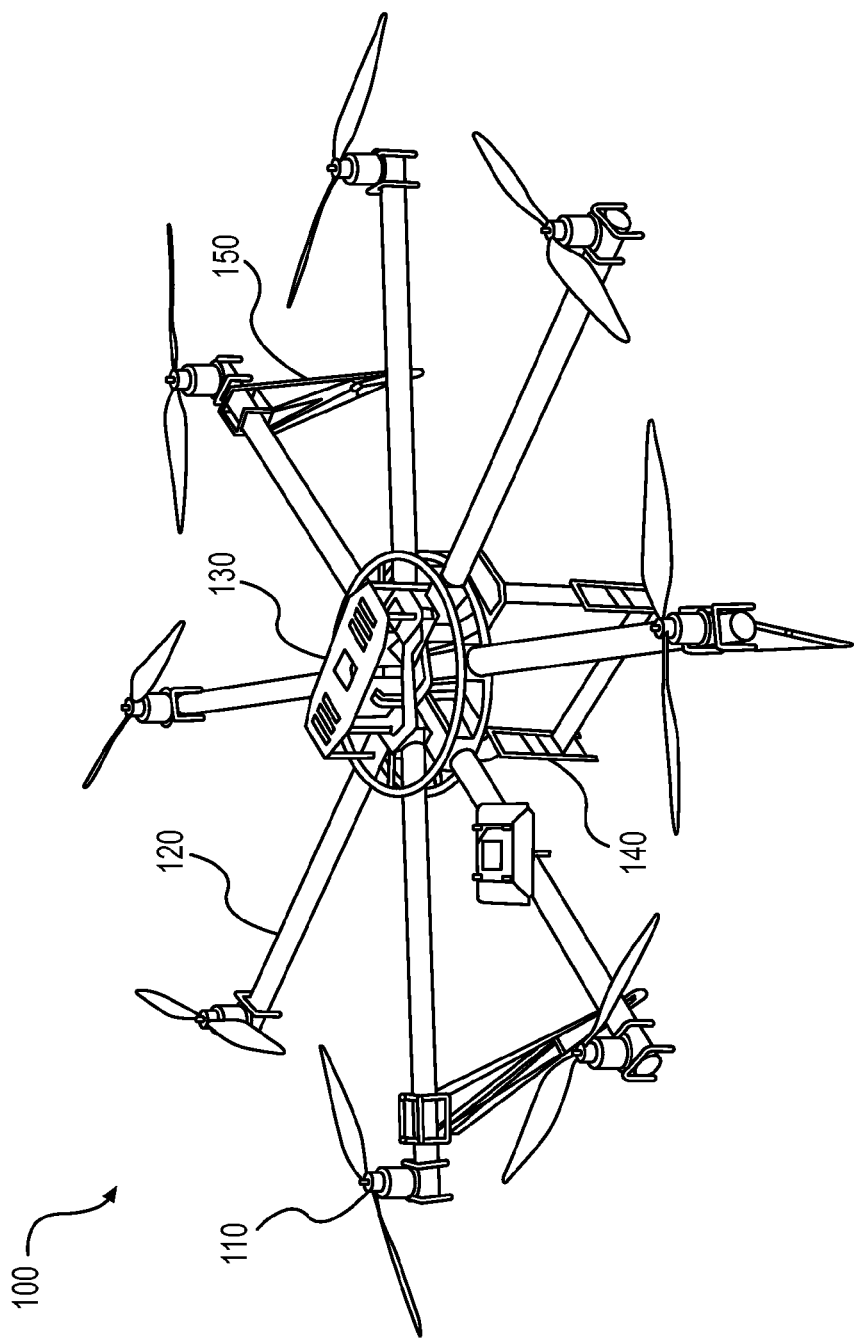
FIG. 1 illustrates an exemplary unmanned aerial vehicle (UAV) drone.

Referring now to the drawings, in which like numerals refer to like components or steps, there are disclosed broad aspects of various exemplary embodiments.

As used herein the term "drone" may refer to any vehicle without an on-board human pilot. For example, drones may include, but are not limited to, UAVs, fixed-wing UAVs, rovers, walking robots, hovercraft, submersibles, and surface vehicles. These drones may utilize various modes of propulsion and/or flight.

FIG. 1 illustrates an exemplary unmanned aerial vehicle (UAV) drone 100. UAV drone 100 may be a commercially available UAV platform that has been modified to carry specific electronic components as described in further detail below. UAV drone 100 may include rotors 110, supports 120, electronics case 130, lower frame 140, and landing gear 150. Rotors 110 may provide lift for UAV drone 100. As shown in FIG. 1, an exemplary UAV drone 100 may include eight rotors. The number and size of the rotors may vary based on particular lift and flight time needs. Supports 120 may connect rotors 110 together. In various embodiments, supports 120 may be light-weight carbon fiber rods. Electronics case 130 may be any container for housing electronics components. In various embodiments, electronics case 130 is a weatherized, light-weight, plastic pod. Electronics components within electronics case 130 may be secured to the electronics case and grounded. Electronics components may also be surrounded with fireproof foam or mounted on rubberized brackets to reduce vibration. Electronics case 130 may include heat sinks, fans, or vents to dissipate heat generated by electronics components. Lower frame 140 may provide a mounting point for attaching components outside of electronics case 130. Landing gear 150 may allow UAV drone 100 to rest on a flat surface and absorb impact during landing.

Figure 2:
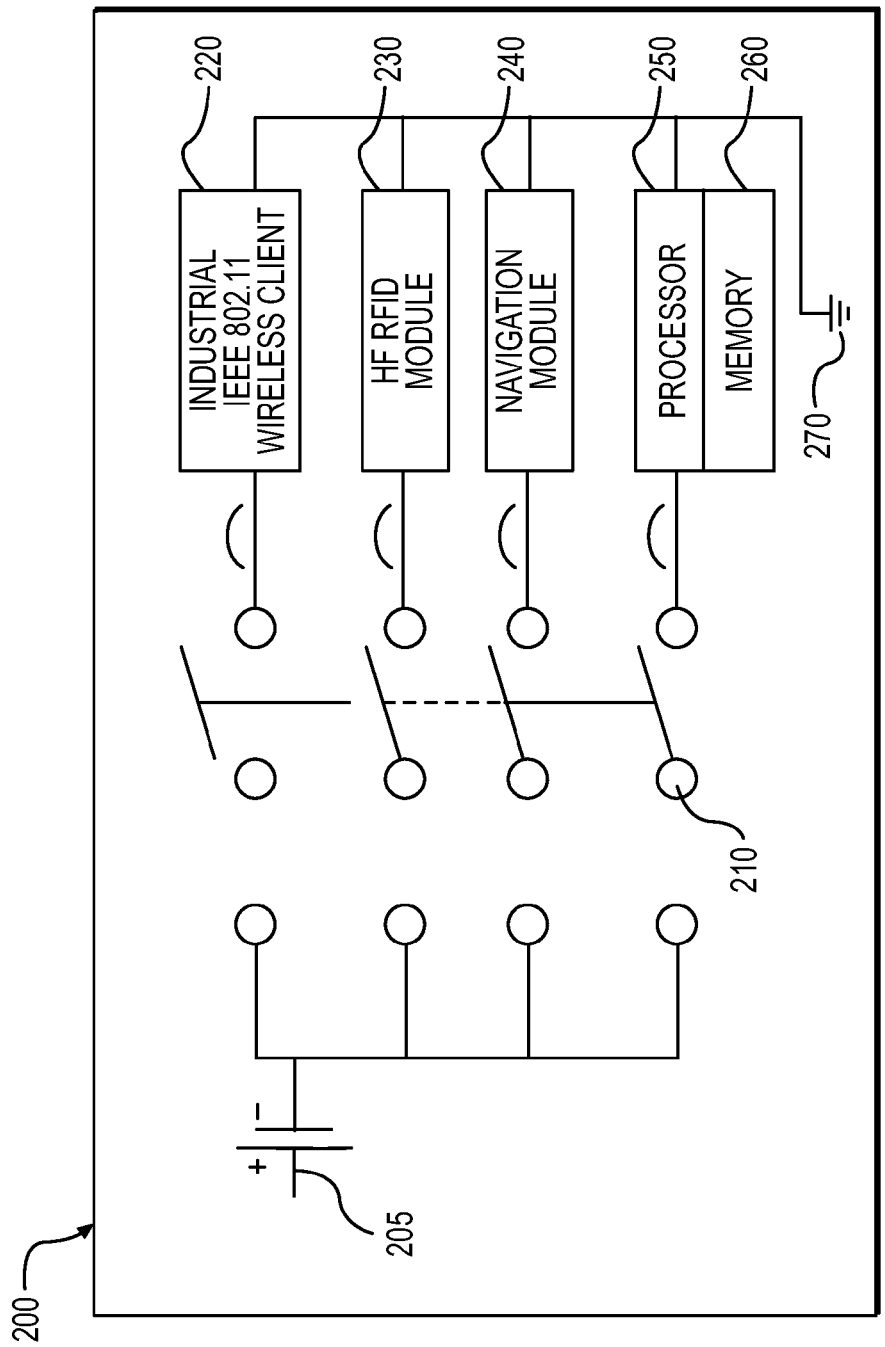
FIG. 2 illustrates a schematic diagram of electronic components of the drone of FIG. 1.

FIG. 2 illustrates a schematic diagram of electronic components of a drone 200. Drone 200 may be built on UAV drone platform 100. Drone 200 may include a battery 205, switch 210, wireless client 220, RFID module 230, GPS receiver 240, processor 250, and memory 260. The electronic components of drone 100 may be connected to ground 270. In other embodiments, RFID module 230 may be replaced or used in conjunction with other detection and sensing devices, which may include quick response codes, bar code scanners, laser scanners, electrical/optical equipment with recognition software, infrared scanners, radar, sonar, chemical sensors, or an audio/visual device with recognition software. In some embodiments, this drone may also include an avoidance or anti-collision system. In some embodiments, this drone may also include an airbag system, capable of inflating to coordinate with safety systems to protect customers in the implementation environment.

Battery 205 may store energy for powering drone 200. In various embodiments, battery 205 is a lithium-ion battery. The battery power source may be augmented or replaced by a fuel cell, solar unit, laser powering system, or other remote charging methodology. In some embodiments, the battery may be charged using inductive charging methods. Any battery providing sufficient power for drone 200 may be used. It should be appreciated that a battery with a high energy to weight ratio may improve flight time of drone 200.

Switch 210 may be a switch such as a single throw multiple post switch for simultaneously switching power to each of the electronics components of drone 200.

Wireless client 220 may be an industrial IEEE 802.11 wireless client. Any wireless protocol may be used. Power consumption of wireless client 220 may be considered in selecting a specific device and protocol. For example, wireless client 220 may require 12 to 48 volts DC at 0.16-0.55 Amps. In various embodiments, IEEE 802.11a, b, g, n, or ac protocols may be used or any other wireless communication protocol. Wireless client 220 may be capable of high speed handoffs using, for example, 100 ms client based Turbo Roaming. Accordingly, wireless client 220 may be in communication with multiple wireless access points during flight of drone 100. Wireless client 220 may use security protocols such as WEP, WPA, WPA2, and 802.11X to secure wireless communications. Filters may be used to limit wireless traffic to prevent interference.

RFID module 230 may be a high frequency RFID reader. Power consumption of RFID module 230 may be considered in selecting a specific device and protocol. In various embodiments, RFID module 230 may require 2.5-3.6 volts DC and have a maximum working current of 45 mA and a sleep current of 10 μA. RFID module 230 may be able to read various types of RFID tags. For example, RFID module 230 may support Ultralight, NTAG203, MIFARE™ Mini, MIFARE™ Classic 1K, MIFARE™ Classic 4k, and FM11RF08 and may also read any EPC tag classification, for example EPC Class 0 or 1 and generations thereof. The speed of the drone may be controlled to ensure that RFID module 230 is capable of accurately reading RFID tags while in motion. In some embodiments, the RFID reader may include RFID radar technology capable of sensing direction and distance from a given RFID tag to determine the positions of detected tags. The speed of the drone may based on the number or density of tags, direction of tags, and distance to tags.

A spatial identifier may be utilized to determine RFID tag location. These spatial identifiers may include RFID tags which are placed at previously determined physical locations to create a grid of known physical data points. Alternative types of input devices (e.g. quick response codes, laser scanner, bar codes, electrical/optical sensors with recognition capabilities) may also provide spatial information in a similar manner. RFID tags are known in the art to identify, track, and locate stored items, e.g. in a warehouse environment. Spatial information may be attached to permanently affixed RFID tags. As such, a network or location grid may be developed to permit the derivation of precise location of the point read.

RFID module 230 may be connected to wireless client 220 via a connection such as, for example, Ethernet, USB, or E²C. As RFID module 230 reads RFID tags, RFID module 230 may send tag identification information to wireless client 220 for transmission as described in further detail below. In various embodiments, RFID module 230 may be configured to read particular data fields from RFID tags and format the read data into packets. If RFID radar technology or other location detecting sensor is implemented, RFID tag distance and direction may be used to calculate precise location.

Navigation module 240 may be any receiver for receiving location signals and determining a location. For example, navigation module 240 may include a GPS receiver for receiving GPS location signals and determining a location. Location data may also be calculated using WiFi triangulation, RFID tag positioning, hardwired/physically placed network equipment, and pre-positioned quick response code tags and other sensing media. In various embodiments, navigation module 240 may be integrated with a compass module and a drone navigation system. Alternatively, processor 250 and memory 260 may perform navigation based on data received from navigation module 240. Navigation module 240 may receive navigation path information stored in memory 260 or navigation path information provided via wireless client 230. Navigation module 240 may operate between 4.0-6.0 volts at 60 mA. In various alternative embodiments, navigation module 240 may provide information to a human pilot who remotely controls drone 200 via wireless client 220.

A traveled route may be established to calculate RFID tag location and presence. This route may be delivered to the drone either by a manned pilot communicating remotely with the drone, via an autonomous route determined by onboard or remote software, or via a pre-determined route programmed into the device using either the on-board computing power of the drone or by a computer communicating with the device via the wireless client 200.

A method of determining the position and presence of RFID tags may be implemented. As the drone travels the path, data provided either by Navigation module 240, RFID module 230, wireless data provided by wireless client 200, by spatial identifiers, or combinations thereof, may be utilized to determine the position and presence of detected RFID tags in two and three dimensional space. Utilizing a specific pre-determined path, e.g. either a raster or parabolic path, spatial data and presence data will be collected, and RFID tag data may be collected. As tags are sensed, the physical location and the tag sensed may be stored. Using a RFID reader, the tags may be sensed within an adjustable range, for example within an approximate 0.5-12 meter radius. As the drone passes out of range of the first tags sensed and collects the next set of tags, this data and location information may be stored. As the drone navigates its flight path, signals from new RFID tags may be collected and signals from previously collected RFID tags will be lost. Via software located on the network environment 400, software may be utilized to determine the precise location of the tags detected. When the tag is no longer detected, a physical position may be determined. This position may then be identified in the software, stored, and then transferred to client systems as required.

A method of self-calibration may be utilized to ensure that the drone can successfully perform the elements described above. This calibration may include configuration and quality checks on the drone platform, the sensor arrays attached to the platform, the communication systems on the platform, all necessary communication linkages, safety systems, power systems, propulsion systems, computing systems, and data transfer. The drone may be directed to travel to a known calibration point, e.g. a "configuration station", to test its capabilities against a series of known and pre-determined data points. This enables the drone to calibrate its system against this known information. Status information may be transferred to a maintenance system either on-board the drone or transferred wirelessly to controlling networks. The drone in certain embodiments may continue its mission if certain system failures permit, else it may be configured to return to a point of origin for configuration or repair either manually, programmatically, or autonomously as necessary. If during travel on-board safety systems detect a significant systems error, the drone may be either instructed to return to point of origin or immediately cease travel in the safest means possible.

Processor 250 may control operation of various computer programs on drone 100. Processor 250 may be connected to wireless client 220, RFID module 230, and GPS 240. Processor 250 may receive data from one component and format the data for use by another component. Processor 250 may be communicatively coupled to a memory 260. In various embodiments, processor 250 may be integral with another electronic component, such as, for example, Navigation module 240.

Memory 260 may store a computer program or instructions for execution by processor 250. In various embodiments, memory 260 may store flight information for an operating environment. The flight information may include predetermined flight paths and restricted areas. For example, a drone operating within a warehouse may use a predetermined flight path to traverse the entire warehouse efficiently and scan RFID tags. As another example, in a drone operating within a shopping mall, memory 260 may store a mapping of restricted areas where obstacles may make it difficult for the drone to navigate. In various embodiments, memory 260 may store any information read by sensors on drone 100 such as RFID module 230.

Figure 3:
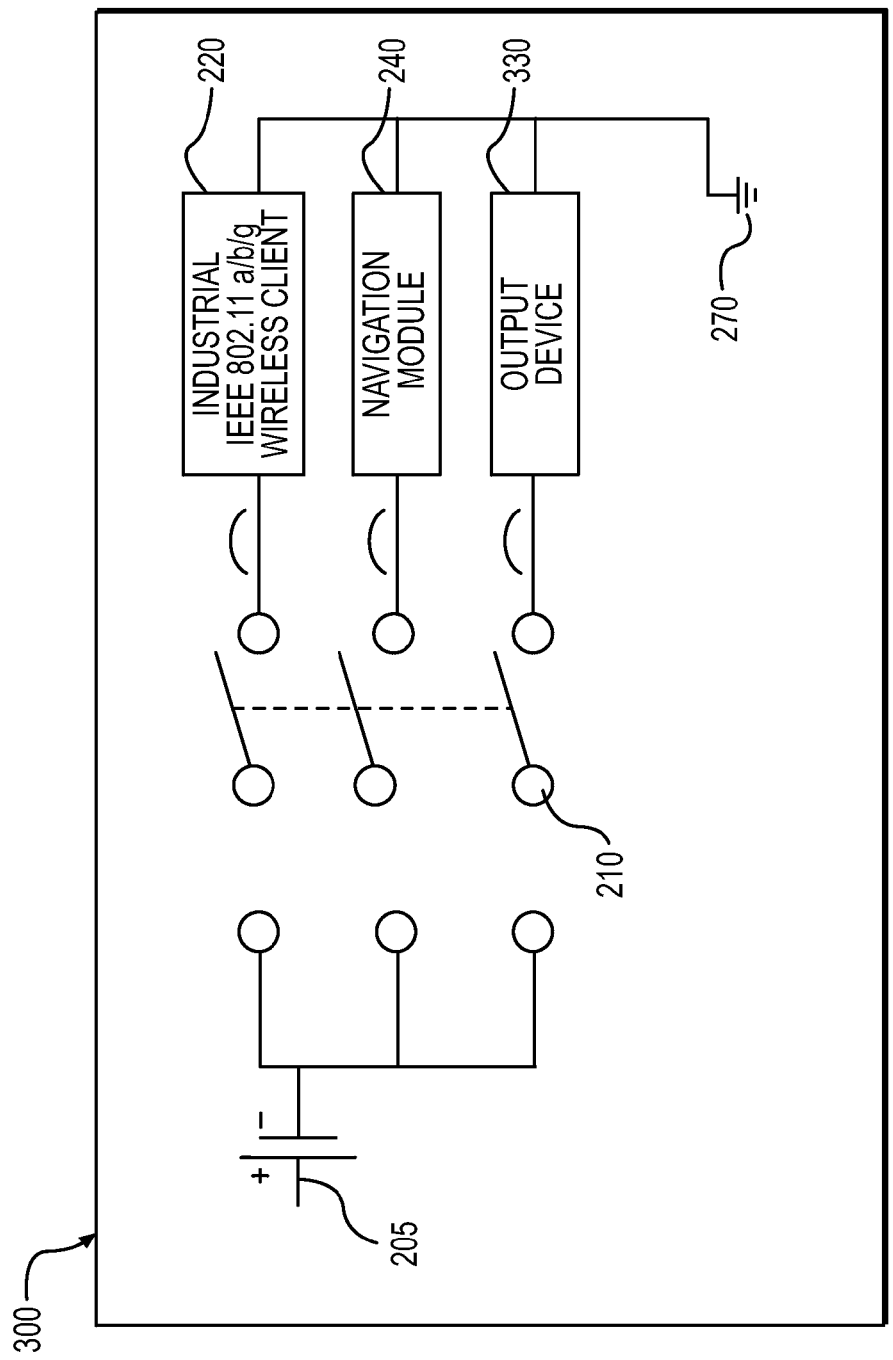
FIG. 3 illustrates another schematic diagram of electronic components of the drone of FIG. 1.

FIG. 3 illustrates another schematic diagram of electronic components of an embodiment of a drone 300. Drone 300 may be built on UAV drone platform 100. Accordingly, drone 300 may include some of the same components as drone 200. Drone 300 may include a battery 205, switch 210, wireless client 220, and GPS receiver 240. The electronic components of drone 300 may be connected to ground 270. Drone 300 may also include an output device 330.

Output device 330 may be any device that allows local communication from the drone. In various embodiments, output device 330 may be an audio system. Other examples of an output device 330 include a projector and printer. Output device 330 may receive data via wireless client 220 and process the received data to interact with people near drone 300. For example, drone 300 may receive messages for customers within a shopping mall. The messages may include advertisements, promotions, coupons, receipts, and directions. As will be described in further detail below, output device 330 may provide messaging to an individual customer.

Figure 4:
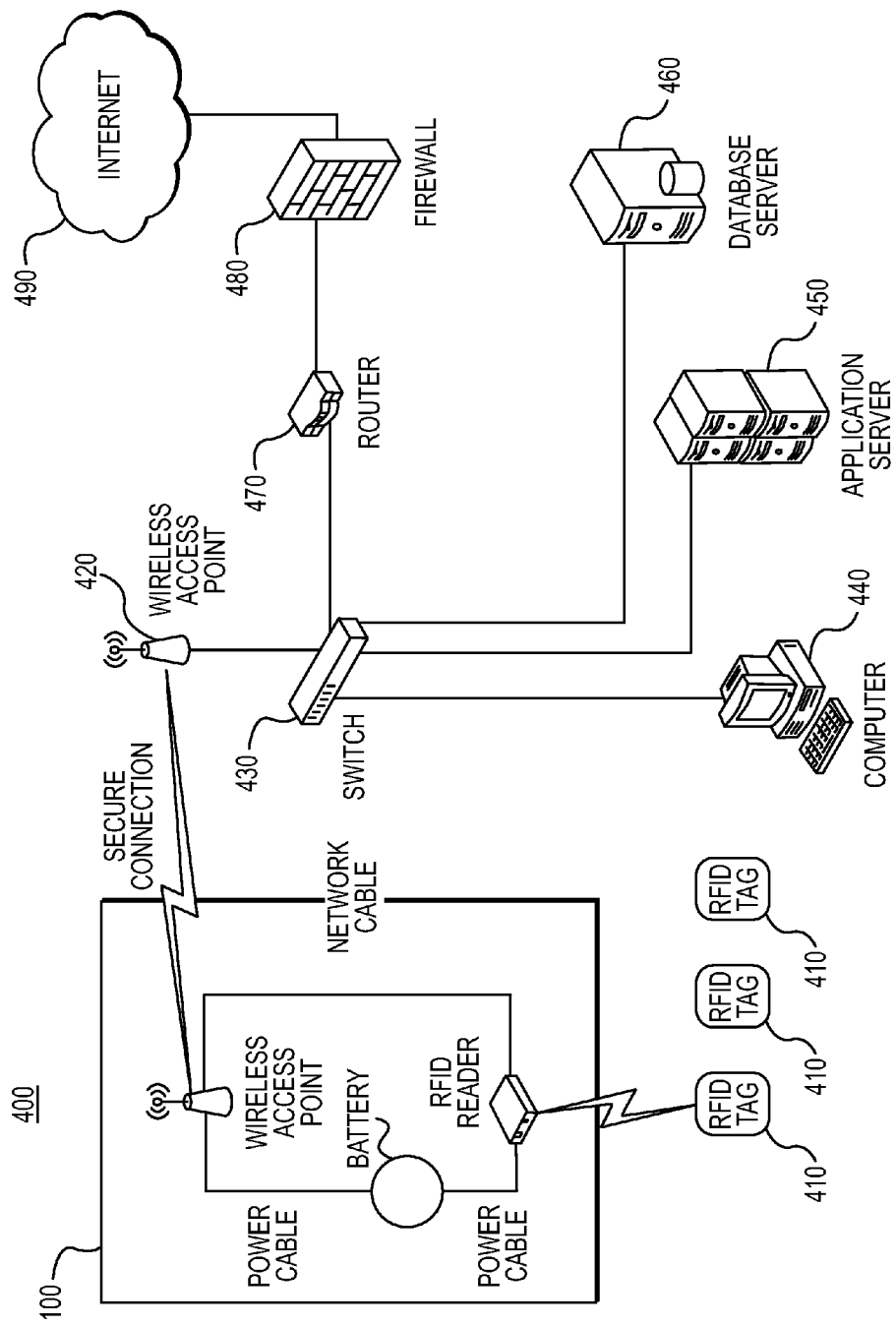
FIG. 4 illustrates an exemplary network environment for a drone.

FIG. 4 illustrates an exemplary network environment 400 for a drone 100. Network environment 400 may be any location where connectivity to drone 100 is supported. Drone 100 may correspond to UAV drone 100 as described above. In various exemplary embodiments, the network environment 400 may be located inside a building such as a warehouse or retail complex. In various embodiments, the network environment may be an outdoor space such as a storage yard, depot, or stadium. Network environment 400 may include RFID tags 410, wireless access point 420, switch 430, computer 440, application server 450, and database server 460, router 470, firewall 480, and network 490. In certain embodiments, application server 450 and database server 460 may be replaced with cloud computing services, a unified server product, an enterprise resource planning (ERP) systems, or similar data processing technology.

RFID tags 410 may include any RFID compatible tags. RFID tags 410 may be either passive RFID tags or active RFID tags. For example, RFID tags 410 may include: Ultralight, NTAG203, MIFARE Mini, MIFARE Classic 1K, MIFARE Classic 4k, FM11RF08, and all EPC Classifications. In various embodiments, RFID tags 410 may be attached to fixed locations within network environment 400. As will be explained in greater detail below, fixed location RFID tags may be used for navigation. In various embodiments, RFID tags 410 may be attached to movable objects such as containers, pallets, or individual product units. As will be explained in further detail below, drone 100 may be used to monitor the location of movable RFID tags 410.

Wireless access point 420 may be a wireless access point in communication with a wireless client 220 located on board drone 100. In various embodiments, wireless access point may use IEEE 802.11 wireless protocols. A wireless protocol may be selected based on the size of the network environment, required data rate, and power needs of the drone.

Switch 430 may be a local area network (LAN) switch that connects network elements. Switch 430 may be an Ethernet, wireless, or combination switch. In various embodiments, switch 430 may be integrated with wireless access point 420 and/or router 470.

Computer 440 may be a computer terminal providing an operator access to the network. In various embodiments, an operator may interact with the drone 100, application server 450, and database server 460. For example, as will be explained in further detail below, computer 440 may be used to control drone 100. As further examples, an operator may use computer 440 to monitor application server 450 or update database server 460.

Application server 450 may execute various applications for interaction with drone 100. For example, application server 450 may receive RFID information and location information from drone 100 and update database server 460. As another example, application server 450 may receive customer information from network 490 and provide instructions to drone 100.

Database server 460 may store data related to drone 100. For example, database server 460 may store RFID and location data transmitted by drone 100. Database server 460 may store a database of relations between RFID tags, locations, and physical objects such as products.

Figure 5:
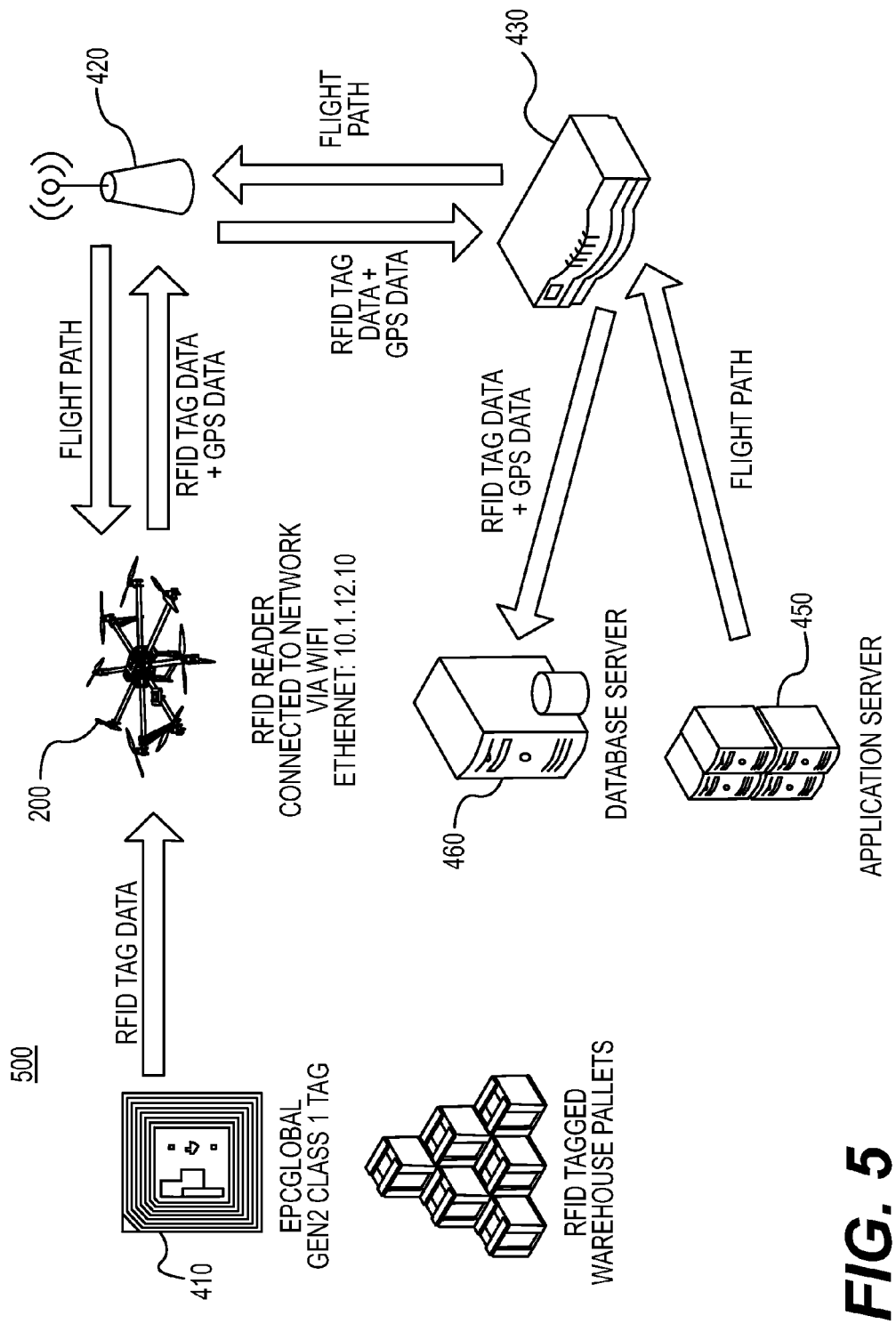
FIG. 5 illustrates data flows in an exemplary drone network.

FIG. 5 illustrates data flows in an exemplary drone network 500. Drone network 500 may include RFID tags 410, drone 200, wireless access point 420, router 430, application server 450 and database server 460. Database server 460 may be an enterprise resource planning (ERP) system.

RFID tags 410 may be affixed to warehouse objects such as pallets, containers, or individual stock units. Each RFID tag 410 may include tag information such as a unique identifier. The tag information may follow any known format such as, for example, EPCGlobal specifications. The tag information may also be stored in database server 460 in association with information regarding the warehouse object. Accordingly, the tag information may be used to associate a physical warehouse object with stored information. Each RFID tag 410 may transmit RFID tag data such as a tag identifier to the drone 200. The drone 200 may transmit the RFID tag data to wireless access point 420 using an IEEE 802.11 wireless protocol. Drone 200 may also transmit GPS location information to wireless access point 420. The GPS location information may be appended to the RFID tag data in each packet transmitted by drone 200 or transmitted separately. The wireless access point 420 may then transmit the RFID and GPS location information to database server 460 via router 430 using Ethernet.

Drone 200 may read the RFID tags 410 as the drone 200 passes by each RFID tag 410 in the course of a flight path. The flight path may be transmitted by an application server 450, which may be connected to or otherwise in communication with the database server 460. The flight path may be a regular flight path periodically traversed by the drone 200 in order to scan all objects in the warehouse. In various embodiments, the application server 450 may designate a specific flight path for a particular purpose. For example, if database server 460 detects an error or other change of status of an object it may provide the expected location of the object to application server 450. Application server 450 may determine a flight path for the drone 200 to travel to the expected location. Drone 200 may read RFID tags at the expected location to determine whether the object is at the expected location. Drone 200 may wait at the expected location for a designated time period to determine whether the object arrives during the designated time period. Drone 200 may also receive a search flight path if the object is not present at the expected location. The search flight path may provide designated locations where the object may have been moved.

Database server 460 may receive the RFID tag data and GPS location data transmitted by the drone 200. If the RFID tag data is not associated with the GPS location data, database server 460 may associate the RFID tag data with GPS location data based on timestamps of the packets carrying the data or the time when the data is received. Database server 460 may use the received data to update records for the objects. For example, Database server 460 may retrieve a record associated with a unique identifier received as RFID tag data and update the record with the associated GPS location information. Similarly, Database server 460 may update a record for a storage location with RFID tag data associated with GPS locations within the storage location.

Database server 460 may be integrated with other business operations. For example, database server 460 may be an inventory management system for a retailer storing products in a warehouse. Database server 460 may receive information regarding transactions involving the objects. Accordingly, records in database server 460 may be updated whenever objects are moved because of a transaction. The database server 460 may further include or be in communication with a material resource planning system and also be utilized to efficiently manage materials, track the location and presence of materials within a warehouse, and identify the need for replacement items. Current methods to update a material resource planning system may require manual interaction which may be relatively slow and inaccurate. The described methods may permit the dynamic reallocation of assets within a warehouse environment, e.g. more popular items can be moved closer to the entrance of a warehouse or closer to the elements of the warehouse tasked with packaging and shipping these items. As items are shifted within the warehouse, their location may be updated within the ERP. Material Resource Planning efforts may also be optimized by identifying resource shortages. Data tracked by the described method may be passed real-time to the ERP as the drone identifies an item's presence and location. A real-time inventory may be achieved via direct communication with the ERP's inventory records. Additionally, labor utilized to manually inspect and track items within the warehouse may be reduced and the quality of the dataset captured improved upon. These improvements may increase safety, accuracy, and cost efficiencies resulting in value to the customer.

Figure 6:
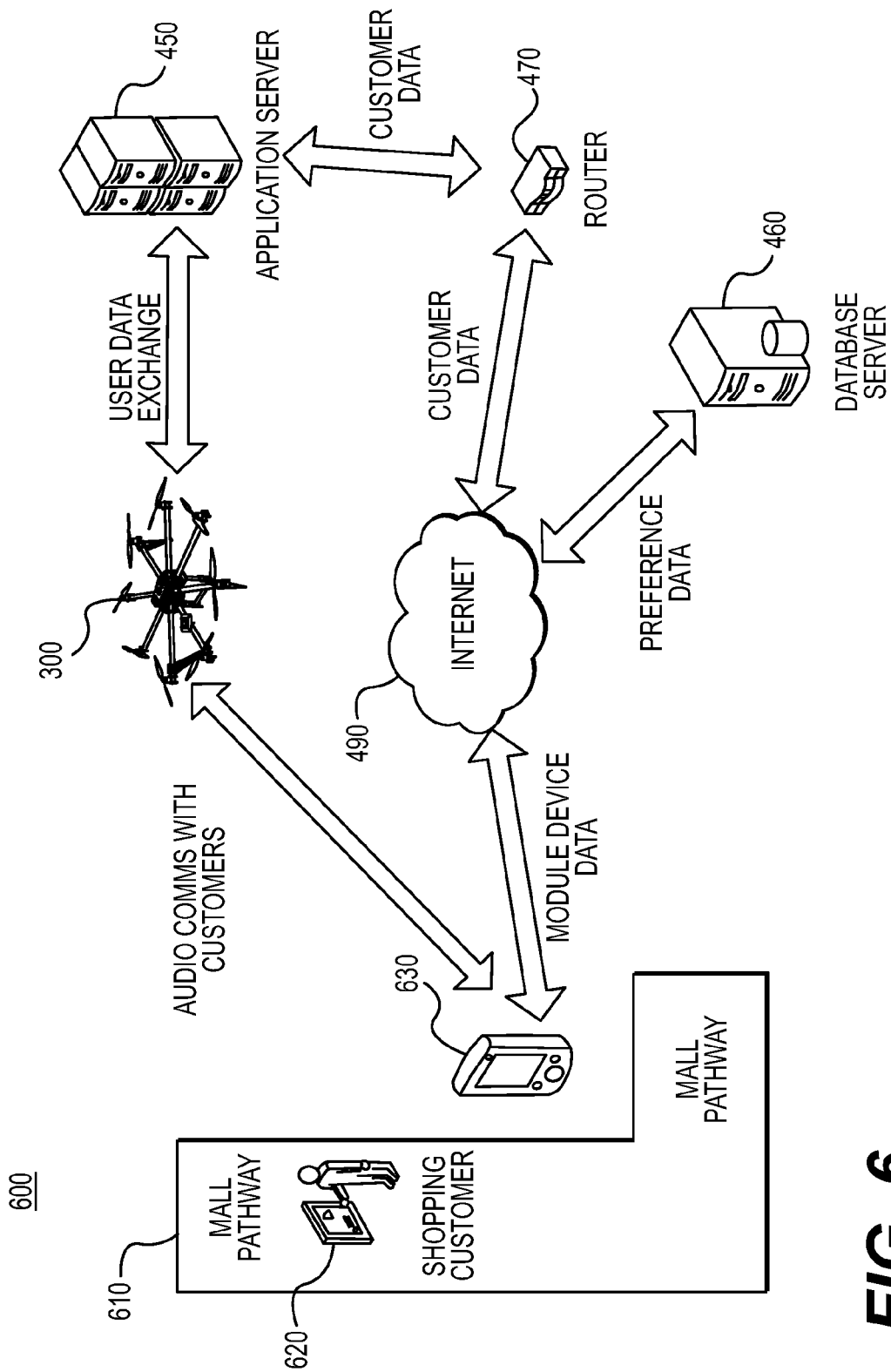
FIG. 6 illustrates data flows in another exemplary drone network.

FIG. 6 illustrates data flows in another exemplary drone network 600. Exemplary drone network 600 may be within a commercial location such as a shopping mall 610, where potential customers 620 may be located. Drone network 600 may also be used in a stadium or other large venue. Drone network 600 may include a customer device 630, drone 300, internet 490, application server 450, database server 460, and router 470.

Customers 620 may use a mobile device 630 to access the internet 490 from a location within the mall 610. Customers 620 may interact with a social networking application provided by application server 450 or a third-party application hosted on a database server 460, with which application server 450 may also interact. The database server 460 may provide preference data to application server 450 via the internet 490. When a customer 620 opts-in to a promotion system linked to application server 450, the mobile device 630 may transmit the customer's location to the application server 450 via the internet 490. In various embodiments, the mobile device 630 may connect to a local wi-fi network to transmit the location data to application server 450. The location data may reach drone network 600 at firewall 480, and travel through router 470, switch 430, and any other nodes necessary to reach application server 450. The application server 450 may use the location data to select target customers and to generate a travel path. An operator controlling the drone via a remote control device may also guide the drone, and it may be directed to the location via an autonomous method. The application server 450 may transmit the travel path including way points to drone 300 via wireless access point 420. The location information and travel path may be updated continuously. Drone 300 may use the travel path to navigate to the customer location. Drone 300 may communicate with customer 620 using audio or visual communication, and may deliver coupons, receipts, and other promotional materials, for example advertisements physically attached to the drone.

Figure 7:
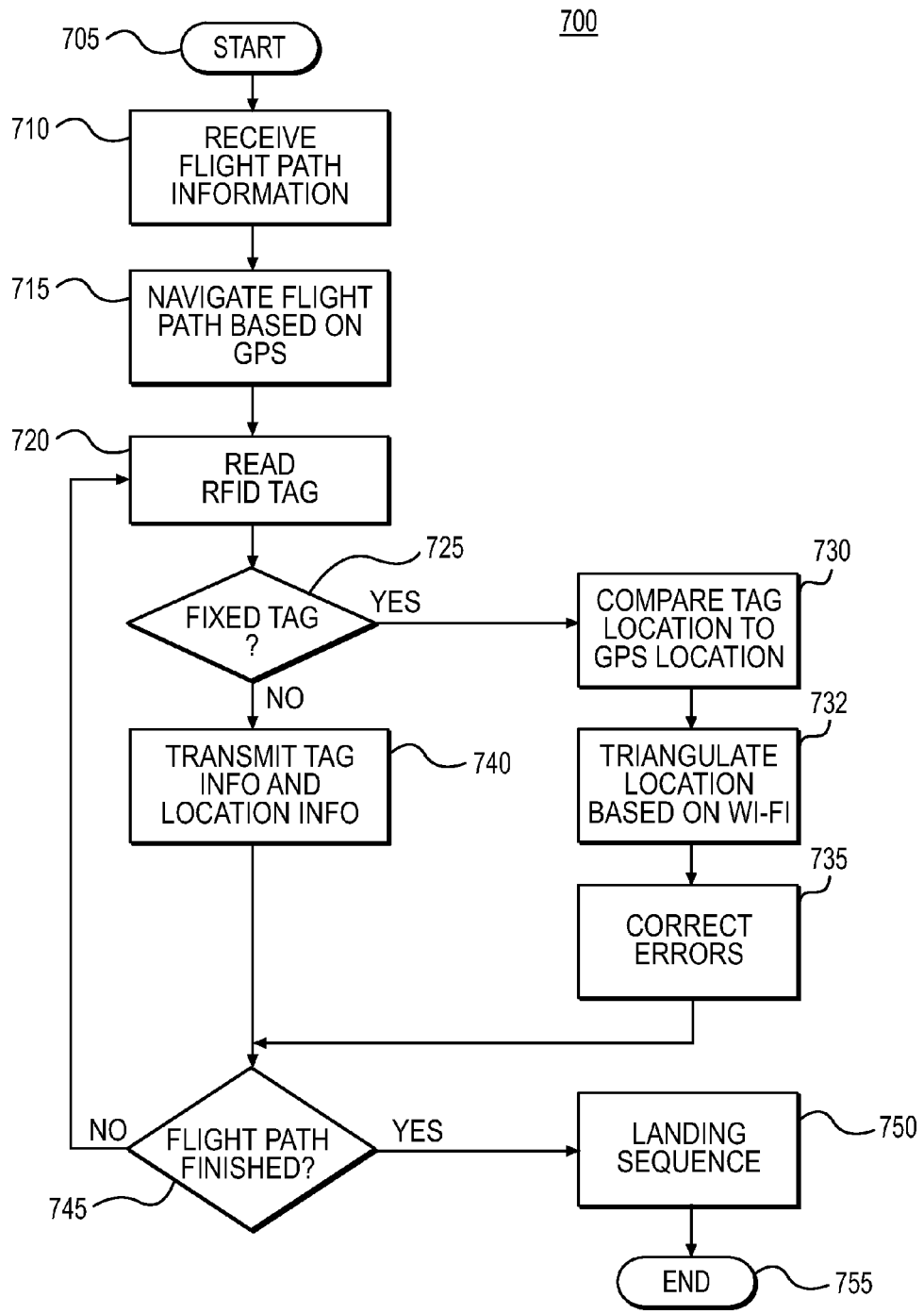
FIG. 7 illustrates an exemplary method of operating a drone to provide storage logistics.

FIG. 7 illustrates an exemplary method 700 of operating a drone to provide storage logistics. In various embodiments, method 700 may be performed by a drone such as drone 200, which has been configured with electronics components including RFID module 230. Method 700 may begin at step 705 and proceed to step 710.

In step 710, drone 200 may receive flight path information. The flight path information may be received via wireless client 220. In various embodiments, the flight path information may be stored in memory 260. In various embodiments, the flight path information may arrive as a continuous stream and be sent directly to GPS module 240 for navigation. In various embodiments, the flight path information may be created autonomously or provided by an individual operating the drone. The flight path information may include location information in the form of coordinates. The flight path information may also include an altitude, drone orientation, and velocity.

In step 715, Navigation module 240 may use the flight path information to navigate drone 200 along the flight path. Navigation module 240 may also continuously determine the position of drone 200 based on signals received from GPS satellites. In various embodiments, Navigation module 240 may also receive RFID location information from RFID module 230. Navigation module 240 may use GPS location information and RFID location information to determine the current location of drone 200. Navigation module 240 may provide data to computing systems which control the rotors 110 to control the movement of drone 200 along the flight path.

In step 720, drone 200 may read an RFID tag using RFID module 230. RFID module 230 may use protocols established for the type of RFID tags used in a network environment. RFID module 230 may acquire an RFID tag identifier and other information from the RFID tag.

In step 725, drone 200 may determine whether the read RFID tag is a fixed position tag. Processor 250 may compare the RFID tag identifier to a list of fixed location tags stored in memory 260. Alternatively, the RFID tag identifier or other information read from the RFID tag may indicate the type of tag and location information. As another alternative, wireless client 220 may transmit the tag information to a remote computing device to determine the nature of the RFID tag. RFID module 230 or wireless 220 may add a timestamp and/or current GPS location to the RFID tag information before transmitting the RFID tag information. If the RFID tag is a fixed tag, the method 700 may proceed to step 730. If the RFID tag is not a fixed tag, the method 700 may proceed to step 740.

In step 730, processor 250 may compare tag location information to GPS location information determined at the time the RFID tag was read. The tag location information may provide a more accurate location because the tag location may be fixed. Accordingly, if the tag location information differs from the GPS location, the tag location information may be assumed to be correct.

In step 732, the drone 200 may determine its own location based on wi-fi signals. Drone 200 may compare the signal strength of one or more wi-fi access points. The signal strength may be indicative of the distance between the drone 200 and a wi-fi access point. If a plurality of wi-fi access points with known locations are present, drone 200 may be able to accurately triangulate its location based on only the wi-fi signals. Drone 200 may also use the wi-fi location data along with GPS and/or tag data to triangulate its position, creating a dataset of location environment that synthesizes data from these various sensors to establish a method of relative navigation.

In step 735, the tag location information and wi-fi location information may be used to correct any errors detected in the GPS location information. For example, the tag location information may be used to determine an offset of the actual location from the GPS location. Similarly, an offset may be determined based on wi-fi location data or a combination of tag and wi-fi data. The offset may then be applied by Navigation module 240 to future GPS location information for navigation purposes. The offset may be updated whenever a fixed location RFID tag is read.

In step 740, wireless client 220 may transmit tag information and location information to a remote computing device such as, for example, application server 450 or database server 460. Wireless client 220 may associate the tag information and location information based on the time when the tag is read. Alternatively, wireless client 220 may continuously transmit both location information and tag information as the information is received. Packets carrying the information may include a timestamp. A remote computing device that receives the location information and tag information may correlate the information based on timestamps. The remote computing device may use the tag and location information to track locations of the tagged items. In various embodiments, the location information may be used by an inventory management system to provide real-time information about inventory location.

In step 745, drone 200 may determine whether the flight path has been completed. Navigation module 240 may compare the current location with a destination location. If the flight path has been completed, the method 700 may proceed to step 750. If the flight path has not been completed, the method 700 may return to step 720 and drone 200 may continue reading RFID tags.

In step 750, drone 200 may perform a landing sequence at the end of the flight path. Drone 200 may land and position itself on a charging station. Drone 200 may be recharged for periodically performing method 700. The method 700 may proceed to step 755 where the method ends.

Figure 8:
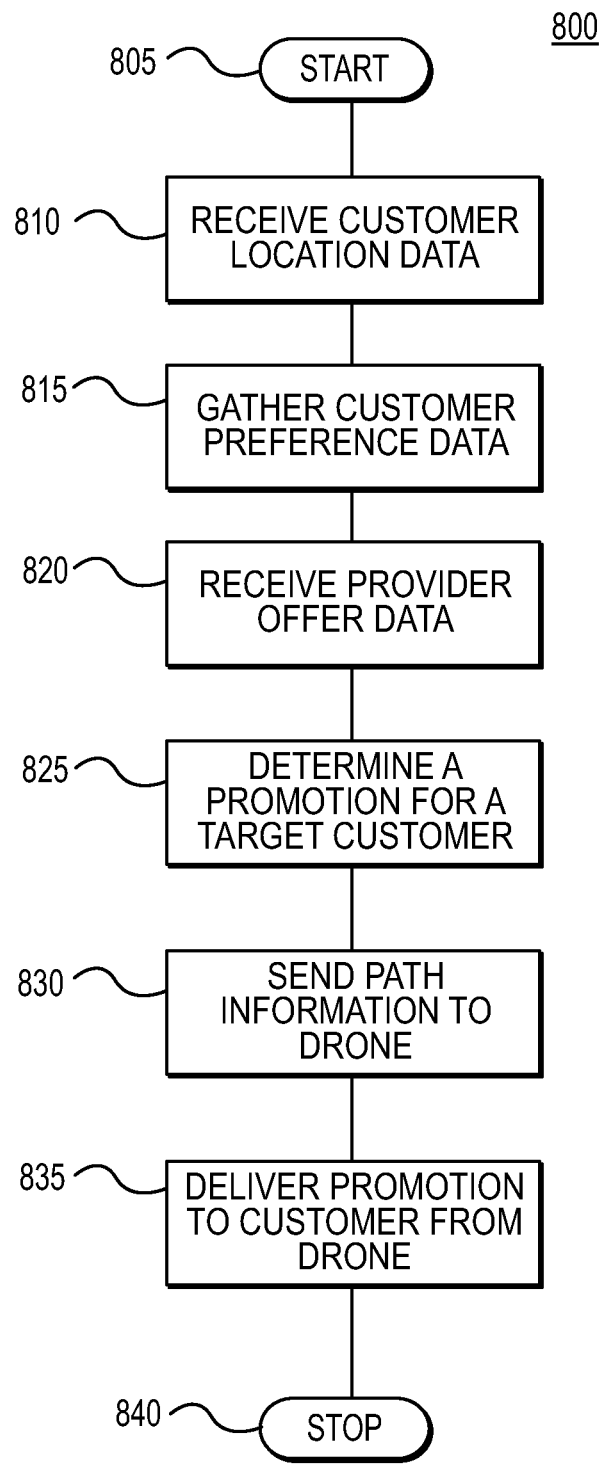
FIG. 8 illustrates an exemplary method of operating a drone to provide promotions.

FIG. 8 illustrates an exemplary method 800 of operating a drone to provide promotions. Method 800 may be performed by various components of network 400 using a drone such as drone 300. The method 800 may begin at step 805 and proceed to step 810.

In step 810, network 400 may receive location data of customers. In various embodiments, target customers may opt-in to providing location data to network 400. For example, application server 450 may use a social networking application to invite a target customer to provide location data to network 400 in exchange for receiving an offer. For example, application server 450 may receive location data via Facebook, Foursquare, QRC Check-In, Google Maps, or any other location indicating service. The customer may use the social networking application and a customer mobile device to provide real-time location information to network 400.

In step 815, the network 400 may gather customer preference data. Customer preference data may be gathered from various sources. In various embodiments, the customer preference data is received from a social networking application. The same social networking application providing location data may also provide preference data about the customer. Alternatively, customer preference information may be received from a different social networking application or another third party provider. The preference data may be preferences selected by the customer specifically to receive promotions. The preference data may also include information regarding customer activities such as public postings, comments, and likes within a social network. The preference data may also include information based on commercial activity of the customer such as on-line purchases and loyalty card data. Database server 460 may store the customer preference information.

In step 820, network 400 may receive provider offer data. In various embodiments, application server 450 may provide an interface for potential providers to make offers. For example, a retailer may submit an offer to provide a discount to customers who are contacted by drone 300. The provider offer data may include information regarding the type of customer the provider is interested in. For example, the provider may be able to specify a particular gender, age, or other characteristic to limit offers. Database server 460 may store received provider offer data. An operator of network 400 may charge a fee or receive a commission for presenting offers to target customers. Application server may also allow a provider, or any other user to directly target a customer. For example, a retailer may be able to direct specific offers to previous customers. As another example, a user may submit an offer to deliver a message to a specific customer.

In step 825, network 400 may determine a promotion for a target customer. The network 400 may generate a target customer list based on location data of customers who opt in to the system. Application server 450 may compare received customer preference data to the target customer list to determine whether the target customer is eligible to receive an offer. Database 460 may compare the customer preference data with the provider offer data. For example, database 460 may query the customer preference data for explicit mention of a product involved in a provider offer. Conversely, database 460 may query provider offer data based on expressed preferences in the customer preference data. Database 460 may also include logic to classify customers based on purchases. Database 460 may classify a customer based on available preference data, then determine an available provider offer based on the classification of the customer. Database 460 may also use social networking information to determine trends and preferences. For example, database 460 may look at activities and purchases of friends of the target customer to determine an offer that the target customer may also be interested in. As another example, database 460 may determine offers based on events related to a target customer. For example, calendar events in a target customer's social network profile may indicate purchasing needs for various gifts. When a match is found between customer preference data and provider offer data the customer may be added to a selected customer list. The selected customer list may include an identifier of the customer and offer information including times and locations where the offer is valid.

In step 830, application server 450 may send flight information to drone 200. The flight information may include the current location of a selected customer. In step 835, drone 200 may use navigation module 240 to navigate to the selected customer location. The drone may also use other navigation methods described above. The drone 200 may deliver a promotion to the selected customer using output device 330. In various embodiments, the drone 200 may play a recorded message or transmit a live message from a human operator. Drone 200 may also project an image onto a floor or wall. Drone 200 may also print a coupon and drop the coupon for the targeted customer. Drone 200 may instruct the selected customer to follow drone 200 to a retail location to redeem the offer. Drone 200 may provide spoken, projected, or written directions to the selected customer. The method may then proceed to step 840, where the method ends.

Figure 9:
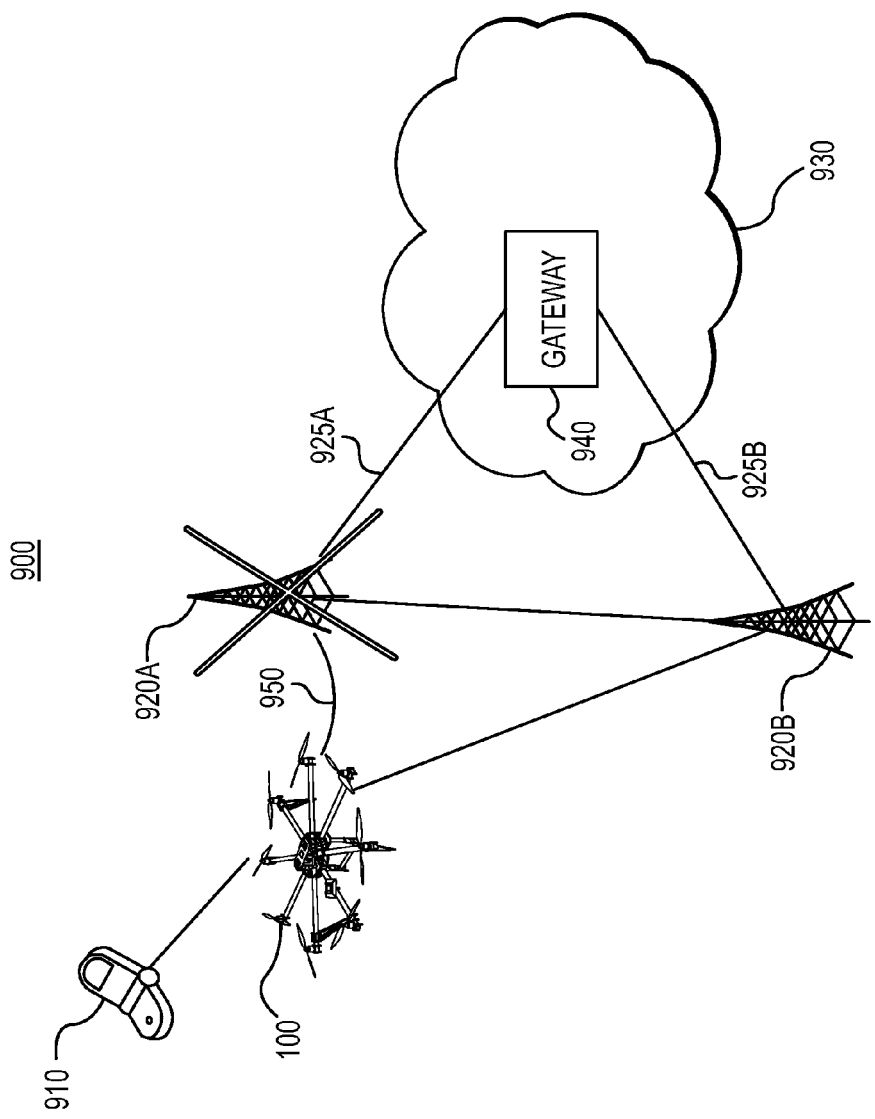
FIG. 9 illustrates an exemplary telecommunications network using a drone.

FIG. 9 illustrates an exemplary network 900 using a UAV drone 100. Network 900 may be used to provide temporary service to mobile devices in the event of a failure of a component of a service provider network. In a fully functioning network, mobile device 910 may access a service provider core network 930 via tower 920a. Tower 920a may include an antenna for radio communication with mobile device 910. Tower 920a may normally communicate with a gateway 940 within service provider core network 930 via a wired connection 925a such as a T1 or T3 connection, or via a line-of-sight microwave transmitter. For example, tower 920a may communicate via radio waves with mobile device 910, and forward the communications via microwave transmitter to tower 920b, which then forwards the communications via wired connection 925b.

In the event that tower 920a experiences a failure in either the antenna or the radio transmitter, UAV 100 may be used to provide service. UAV 100 may be equipped with an antenna and microwave transmitter. Upon detection of a tower failure, UAV 100 may be dispatched to the location of tower 920a. In various embodiments, UAV 100 may be driven to tower 920a by a repair crew. Alternatively, UAV 100 may fly directly to tower 920a if permitted by regulations. Once at tower 920a, UAV 100 may fly to a predetermined height and connect to the service provider network. The UAV 100 may establish a microwave transmitter connection with tower 920b and a radio connection with mobile devices such as mobile device 910. In various embodiments, UAV 100 may be tethered to tower 920a via a wired connection 950 connecting UAV 100 to wired connection 925a. Accordingly, UAV 100 may be used to temporarily replace a dysfunctional antenna on tower 920a even if there is no line of sight to a microwave receiver. In various embodiments, a series of UAVs may be used to create a chain of connected microwave transmitters, e.g. a daisy chain system, to replace the lost connection.

In various embodiments, UAV 100 may be used in a location without a tower 920. For example, UAV 100 may be used to temporarily provide service to an unserviced area such as a remote section of highway or wilderness location. If no tower with a microwave receiver is within range, UAV 100 may be tethered to another communication means such as a satellite transceiver. Accordingly, UAV 100 may be useful in emergency or search and rescue operations. UAV 100 may enable rescuers and victims to communicate where mobile service may not otherwise be available. For example, when a hiker is reported lost, a UAV 100 may be dispatched to the suspected location, where it provides network coverage for the hiker to contact emergency responders. As another example, a UAV 100 may be carried by a research team in a remote area to occasionally set up a communication channel.

According to the foregoing, various exemplary embodiments provide for a modular drone. In particular, by equipping a drone with communications electronics, the mobility and versatility of drones may be used for business purposes.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

The functions of the various elements shown in the Figures, including any functional blocks labeled as "processors", may be provided through the use of dedicated hardware as well as hardware capable of executing software in association with appropriate hardware. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional or custom, may also be included.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:
1. A drone comprising:
   a navigation unit configured to determine the location of the drone and navigate the drone to designated locations within a warehouse, wherein the designated locations form a first flight path that traverses the warehouse to pass within range of a plurality of inventory objects located inside the warehouse;

a radio frequency identification (RFID) reader configured to read RFID tag information from RFID tags associated with the inventory objects located inside the warehouse, wherein the RFID tag information comprises identifiers associated with the inventory objects located inside the warehouse; and a wireless network transceiver configured to:
periodically transmit the location of the drone and RFID tag information including the identifiers associated with the inventory objects located inside the warehouse to an inventory management system, and receive a second flight path comprising a set of search locations indicating one or more locations to where a missing inventory object might have been moved, wherein the navigation unit is further configured to, after the wireless network transceiver receives the second flight path, navigate through the set of search locations to locate the missing inventory object using the RFID reader.

2. The drone of claim 1, wherein the wireless network transceiver is further configured to receive navigation path information including designated locations.

3. The drone of claim 1, further comprising:
a memory configured to store pre-defined location information for a plurality of RFID tags, wherein the RFID reader is configured to read information from at least one of the RFID tags; and
a processor configured to compare the location information from the navigation unit with the pre-defined location information of the read tag.

4. The drone of claim 3, wherein the processor is configured to determine an offset of the location information from the navigation unit with the pre-defined location information of the read tag and to correct a second navigation unit location information based on the offset.

5. The drone of claim 3, wherein the wireless network transceiver is further configured to determine a strength of a wireless network signal; and the processor is configured to triangulate location information based on the strength of the wireless network signal.

6. The drone of claim 3, wherein the memory further stores a pre-defined navigation path comprising a plurality of designated locations corresponding to the plurality of RFID tags.

7. The drone of claim 1, further comprising a weatherized electronics casing surrounding the GPS navigation unit and the wireless network transceiver.

8. The drone of claim 1, further comprising a processor configured to correlate the RFID tag information with the location of the drone before transmitting the information to the inventory management system.

9. The drone of claim 1, further comprising a plurality of rotors.

10. A method performed by a drone, the method comprising:
receiving, by the drone, navigation path information, wherein the navigation path information comprises a set of designated aerial locations forming a first flight path that traverses a warehouse to pass within range of a plurality of inventory objects located inside the warehouse;
navigating along the navigation path based on satellite location signals, wherein navigating comprises flying from a first aerial location within the warehouse to a second aerial location within the warehouse;
determining current position information based on the satellite location signals;

reading radio-frequency identification (RFID) tag information from a first RFID tag associated with an inventory object of the plurality of inventory objects, wherein the RFID tag information comprises a first identifier associated with the inventory object;
transmitting the RFID tag information including the identifier associated with the inventory object and the current position information via a wireless client to a central computing system including an inventory management system;
receiving, by the drone, a search path information comprising a set of search aerial locations forming a search flight path, wherein the set of search aerial locations indicate one or more locations to where a missing inventory object might have been moved; and
navigating along the search flight path through the set of search aerial locations to locate the missing inventory object by reading an RFID tag associated with the missing inventory object.

11. The method of claim 10, further comprising:
associating the current position information with the RFID information based on a time when the RFID information is read; and
transmitting the associated position information with the RFID information.

12. The method of claim 11, further comprising:
reading a second RFID tag having a fixed location;
determining the fixed location of the second RFID tag;
determining position information for the time the second RFID tag is read based on the satellite location signals; and
determining an offset of the fixed location from the position information,
wherein the step of navigating the flight path based on satellite location signals comprises determining adjusted position information based on the offset and the satellite location signals.

13. The method of claim 10, further comprising:
determining a strength of a wireless network signal received via the wireless client;
determining a distance from a wireless access point based on the strength of the wireless network signal; and
adjusting the position information based on the distance from the wireless access point.

14. The method of claim 10, further comprising:
determining that the drone has reached an end of the navigation path; and
connecting the drone to a charger at the end of the navigation path.

15. A network system comprising:
a plurality of RFID tags affixed to inventory objects located inside a warehouse, the RFID tags storing tag information identifying the inventory objects including identifiers associated with the inventory objects;
a drone configured to:
navigate the drone to designated locations within the warehouse, wherein the designated locations form a first flight path that traverses the warehouse to pass within range of a plurality of the inventory objects located inside the warehouse,
read the tag information from at least one of the RFID tags affixed to the inventory objects located inside the warehouse,
determine a location of the drone,
wirelessly transmit the location of the drone and the read tag information, receive a second flight path comprising a set of search locations indicating one or more locations to where a missing inventory object might have been moved, and navigate through the set of search locations to locate the missing inventory object by reading an RFID tag affixed to the missing inventory object; and an inventory management system configured to:

receive the RFID tag information including the identifiers associated with the inventory objects and drone location information from the drone, retrieve a record of the inventory object identified by at least one of the identifiers update the record with the location of the drone, identify a missing inventory object by determining, based on the received RFID tag information, that the missing inventory object is not located in an expected location of the missing inventory object, and transmit the second flight path to the drone to locate the missing inventory object.

16. The network system of claim 15, wherein the inventory management system is configured to correlate the drone location information and the RFID tag information based on a time that the information is received.

17. The network system of claim 15, wherein the drone is configured to correlate the RFID tag information and the drone location information before transmitting the information.

18. The network system of claim 15, wherein the inventory management system is further configured to: detect a change in the status of an object, determine an expected location of the object based on the record; transmit the expected location to the drone as a designated location.

19. The network system of claim 18, wherein the drone is further configured to: receive an identifier of an object and the expected location of the object, navigate to the expected location of the object, and determine whether an RFID tag including the identifier of the object is present at the expected location.

20. The network system of claim 14, wherein the drone is an unmanned aerial vehicle comprising a plurality of rotors.

* * * * *